United States Patent
Pars et al.

[15] 3,676,462
[45] July 11, 1972

[54] 7,8,9,10-TETRAHYDRO (AND 7,8,9,10,11,12-HEXAHYDRO) 6H-DIBENZO [B,D] PYRANS

[72] Inventors: Harry G. Pars, Lexington; Felix E. Granchelli, Arlington, both of Mass.

[73] Assignee: Arthur D. Little, Inc., Cambridge, Mass.

[22] Filed: Jan. 8, 1970

[21] Appl. No.: 1,550

Related U.S. Application Data

[63] Continuation-in-part of Ser. No. 642,187, May 29, 1967, abandoned.

[52] U.S. Cl. ............................260/345.3, 424/283, 260/247.2 A, 260/247.7 A, 260/247.2 B, 260/326.3, 260/293.58, 260/326.5 D, 260/326.5 J, 260/293.56

[51] Int. Cl. ..................................................C07d 7/20
[58] Field of Search............................................260/345.3

[56] References Cited

UNITED STATES PATENTS 3,325,489  6/1967  Bolger..........................260/345.3 X

*Primary Examiner*—John M. Ford
*Attorney*—Bessie A. Lepper

[57] ABSTRACT

A series of novel 7,8,9,10-tetrahydro-6H-dibenzo [b, d] pyrans and 7,8,9,10,11,12-hexahydro-6H-dibenzo [b,d] pyrans having C.N.S. activity.

3 Claims, No Drawings

7,8,9,10-TETRAHYDRO (AND 7,8,9,10,11,12-HEXAHYDRO) 6H-DIBENZO [B,D] PYRANS

This application is a continuation-in-part of our application Ser. No. 642,187 filed May 29, 1967, now abandoned.

This invention relates to novel chemical compositions of matter known in the art of chemistry as 7,8,9,10-tetrahydro-6H-dibenzo[b,d]pyrans and 7,8,9,10,11,12-hexahydro-6H-dibenzo[b,d]-pyrans having the formulas Ia, b and IIa, b, respectively:

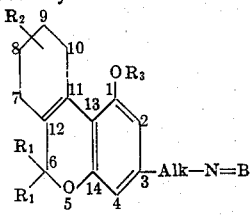
Ia

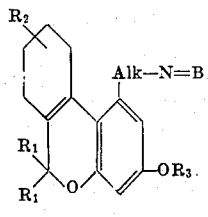
Ib

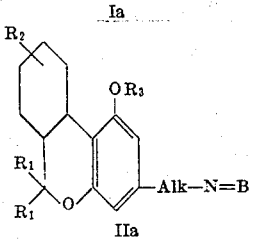
IIa

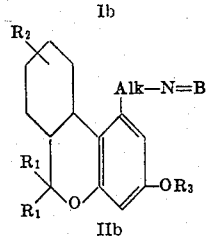
IIb and to the preparation of these compounds from 6-oxo-7,8,9,10-tetrahydro-6H-dibenzo[b,d]pyrans of formulas IIIa, b:

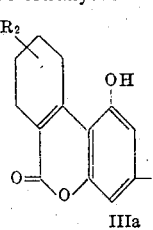
IIIa

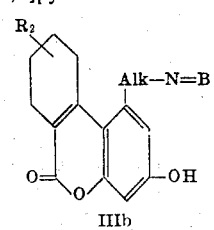
IIIb

In the compounds of formulas Ia, b; IIa, b; and IIIa, b above, $R_1$ is lower-alkyl; $R_2$ is hydrogen or lower-alkyl; $R_3$ is hydrogen, lower-alkyl, lower-alkanoyl, carbamyl, N-lower-alkylcarbamyl, N,N-di-lower-alkylcarbamyl, or phosphonyl; Alk is lower-alkylene; and N = B is di-lower-alkylamino, N-morpholino, N-pyrrolidino, or N-piperidino.

As used herein the term "lower-alkyl" means saturated, monovalent aliphatic radicals, including straight or branched-chain radicals of from one to six carbon atoms, as illustrated by, but not limited to methyl, ethyl, propyl, isopropyl, butyl, sec.-butyl, amyl, hexyl, and the like.

As used herein the term "lower-alkanoyl" means saturated, monovalent aliphatic radicals derived from a monocarboxylic acid, including straight or branched-chain radicals of from one to six carbon atoms, as illustrated by, but not limited to formyl, acetyl, propionyl, α-methylpropionyl, butyryl, hexanoyl, and the like.

As used herein the term "lower-alkylene" means saturated divalent aliphatic radicals, including straight or branched-chain radicals, of from one to six carbon atoms, as illustrated by, but not limited to 1,2-ethylene, 1,3-propylene, 1,2-(1-methylethylene), 1,4-butylene, 1,6-hexylene, and the like.

The compounds of formulas Ia, b where $R_3$ is hydrogen are prepared by reacting a 1-hydroxy-3-(amino-lower-alkyl)-6-oxo-7,8,9,10-tetrahydro-6H-dibenzo[b,d]pyran or a 1-(amino-lower-alkyl)-3-hydroxy-6-oxo-7,8,9,10-tetrahydro-6H-dibenzo[b,d]pyran, having the respective formulas IIIa and IIIb, with a lower-alkyl magnesium halide as illustrated by the equation:

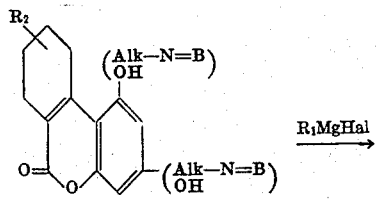

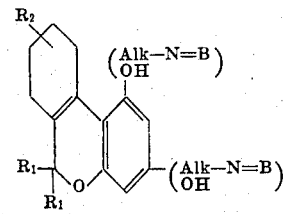

where $R_1$, $R_2$, Alk, and N = B have the meanings given hereinabove, and Hal represents halogen. The reaction is carried out in an organic solvent inert under the conditions of the reaction. Suitable solvents are diethyl ether, dibutyl ether, tetrahydrofuran, anisole, pyridine, and the like. It is preferred to add a solution of the 6-oxo-7,8,9,10-tetrahydro-6H-dibenzo[b,d]pyran in a pyridine or anisole solution, or in a mixture of these solvents, to a solution of the Grignard reagent in anisole.

The compounds of formula IIIa, b, in turn are prepared by reacting an $R_2$-2-carbo-lower-alkoxycyclohexanone of formula IV with a 5-(amino-lower-alkyl)resorcinol in formula V. The reaction is carried out in a mixture of concentrated sulfuric acid and phosphorus oxychloride or in the presence of other acidic condensation agents such as aluminum chloride, hydrogen chloride, or polyphosphoric acid and is illustrated by the equation:

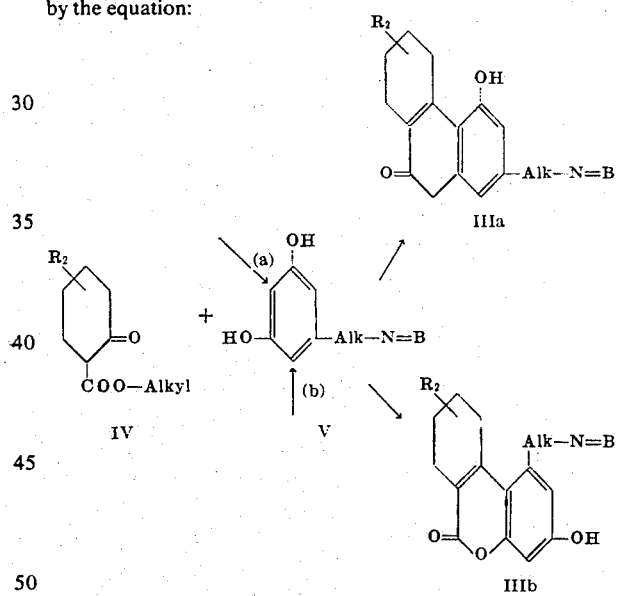

where $R_2$, Alk, and N = B are defined as above, and Alkyl is lower-alkyl.

As indicated by the reaction scheme above, the ring closure of the $R_2$-2-carbo-lower-alkoxycyclohexanone with the 5-(amino-lower-alkyl)resorcinol can take place either by cyclization at the 2-position of the 5-(amino-lower-alkyl)resorcinol, as indicated by the arrow (a) in formula V above, to produce the 1-hydroxy-3-amino-lower-alkyl-6-oxo-7,8,9,10-tetrahydro-6H-dibenzo-[b,d]pyrans of formula IIIa or by cyclization at the 4-position of the 5-(amino-lower-alkyl)resorcinol, as indicated by the arrow (b) in formula V above, to produce the 1-(amino-lower-alkyl)-3-hydroxy-6-oxo-7,8,9,10-tetrahydro-6H-dibenzo[b,d]pyrans of formula IIIb. Generally either the compounds of formula IIIa or of formula IIIb are produced with any 5-(amino-lower-alkyl)resorcinol. However, when the lower-alkylene group, Alk, contains branching at the carbon atom adjacent to the benzene ring, the predominant products are the compounds of formula IIIa, because steric hindrance of the branched lower-alkylene group inhibits cyclization at the adjacent 4-position.

The 5-(amino-lower-alkyl)resorcinols for formula V are advantageously prepared by hydriodic acid cleavage of the corresponding resorcinol di-lower-alkyl ethers which in turn are prepared by lithium aluminum hydride reduction of the corresponding (3,5-di-lower-alkoxy)-lower-alkanoylamines. The latter are prepared by reaction of the generally known (3,5-dilower-alkoxy)-lower-alkanoic acids with a thionyl halide, and reaction of the resulting acid halide with the desired amine.

The $R_2$-2-carbo-lower-alkoxycyclohexanones of formula IV are generally known compounds.

The 1-hydroxy-3-(amino-lower-alkyl)-6,6-di-lower-alkyl-7,8,9,10,11,12-hexahydro-6H-dibenzo[b,d]pyrans and the 1-(amino-lower-alkyl)-3-hydroxy-6,6-di-lower-alkyl-7,8,9,10-11,12-hexahydro-6H-dibenzo[b,d]pyrans of formulas IIa and IIb, respectively, are prepared by reducing with hydrogen over a suitable catalyst the 1-hydroxy-3-(amino-lower-alkyl)-6,6-di-lower-alkyl-7,8,9,10-tetrahydro-6H-dibenzo[b,d]pyrans or 1-(amino-lower-alkyl)-3-hydroxy-6,6-di-lower-alkyl-7,8,9,10-tetrahydro-6H-dibenzo[b,d]pyrans of formulas Ia or Ib, respectively, where $R_1$, $R_2$, $R_3$, Alk, and $N = B$ have the meanings given above. The reaction is carried out in an organic solvent inert under the conditions of the reaction, for example methanol, ethanol, isopropanol, and the like. Suitable catalysts include palladium-on-charcoal, platinum, Raney nickel, and the like. A preferred catalyst is Raney nickel.

The ester and ether derivatives of the compounds of formulas Ia, b and IIa, b, that is the compounds where $R_3$ is lower-alkyl, lower-alkanoyl, carbamyl, N-lower-alkylcarbamyl, N,N-di-lower-alkylcarbamyl, or phosphonyl, are prepared by reacting the corresponding compounds where $R_3$ is hydrogen, preferably in the presence of a basic catalyst, with a lower-alkyl halide, to produce the compounds where $R_3$ is lower-alkyl; with a lower-alkanoic anhydride (or mixed anhydride), to produce the compounds where $R_3$ is lower-alkanoyl; with a molar equivalent of phosgene followed by reaction of the resulting chloroformate with ammonia, a lower-alkylamine, or a di-lower-alkylamine, to produce the compounds where $R_3$ is, respectively, carbamyl, N-lower-alkyl-carbamyl, or N,N-di-lower-alkylcarbamyl; or with one molar equivalent amount of phosphorus oxychloride followed by reaction of the resulting dichlorophosphinate with aqueous sodium or potassium carbonate, to produce the compounds where $R_3$ is phosphonyl. Suitable solvents are benzene, toluene, xylene, and the like, and suitable basic catalysts are alkali metal carbonates, bicarbonates, or hydroxides, dimethylaniline, pyridine, and the like.

The acid-addition salts of the bases herein described are the form in which the bases are most conveniently prepared for use and are the full equivalents of the subject matter specifically claimed. The acid moieties or anions in these salt forms are in themselves neither novel nor critical and therefore can be any acid anion or acid-like substance capable of salt formation with the free base form of the compounds. The preferred type of salts are water-soluble pharmacologically acceptable salts, that is, salts whose anions are relatively innocuous to the animal organisms in pharmacological doses of the salts, so that the beneficial physiological properties inherent in the free base are not vitiated by side effects ascribable to the anions; in other words, the latter do not substantially affect the pharmacological properties inherent in the cations. Appropriate pharmacologically-acceptable salts within the scope of the invention are those derived from mineral acids such as hydrobromic acid, hydriodic acid, nitric acid, phosphoric acid, sulfamic acid and sulfuric acid; and organic acids such as acetic acid, citric acid, tartaric acid, lactic acid, methanesulfonic acid, ethanesulfonic acid, quinic acid, and the like, giving the hydrobromide, hydriodide, tartrate, lactate, methanesulfonate, ethanesulfonate, and quinate, respectively.

Although pharmacologically acceptable salts are preferred, those having toxic anions are also useful. All acid-addition salts are useful intermediates as sources of the free base form even if the particular salt per se is not desired as the final product, as for example when the salt is formed only for purposes of purification or identification, or when it is used as an intermediate in preparing a pharmacologically acceptable salt by ion-exchange procedures.

The compounds of formulas Ia, b and IIa, b have been shown to possess C.N.S. activity as evidenced by gross overt changes induced by intravenous administration in mice in standard tests involving observations of psychomotor activity, reactivity to stimuli, and ability to perform normal, non-conditioned motor tasks. (See Irwin, *Animal and Clinical Pharmacologic Techniques in Drug Evaluation*, Year Book Medical Publishers, Inc., Chicago, Illinois, pp 36–54 (1964).) Administration of these compounds resulted in decreased locomotor activity, decreased sensitivity to pain, decreased exploratory behavior, altered social interaction, and evidence of motor deficits. These test results indicate usefulness of these compounds as psychotherapeutic agents.

The compounds can be prepared for use by dissolving under sterile conditions a salt form of the compounds in water (or an equivalent amount of a non-toxic acid if the free base is used), or in physiologically compatible aqueous medium such as saline, and stored in ampoules for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol, or oil solutions or oil-water emulsions in the same manner as conventional medicinal substances are prepared.

The molecular structures of the compounds of our invention were assigned on the basis of study of their infrared, ultraviolet and NMR spectra and their transformation products, and confirmed by the correspondence between calculated and found values for the elementary analyses for representative examples.

The following examples will further illustrate the invention without, however, limiting it thereto.

EXAMPLE 1

3-(2-Dimethylaminoethyl)-1-hydroxy-6,6,9-trimethyl-7,8,9,10-tetrahydro-6H-dibenzo[b,d]pyran A. 3-(2-Dimethylaminoethyl)-1-hydroxy-9-methyl-6-oxo-7,8,9,10-tetrahydro-6H-dibenzo[b,d]pyran.

A solution of 54.6 g. (0.03 mole) of 3,5-dimethoxybenzoic acid in 65 ml. of thionyl chloride was refluxed for 4 hours, evaporated to dryness, and the dark residue distilled in vacuo to give 53.6 g. of 3,5-dimethoxybenzoyl chloride, b.p. 107°–111°C./1 mm.

A solution of 10 g. (0.05 mole) of 3,5-dimethoxybenzoyl chloride in 50 ml. of dry ether was added to a solution of 6 g. (0.15 mole) of diazomethane in ether. The mixture was allowed to stand at −15° C. for 2 to 3 days, and the mixture filtered. The crystals thus collected were washed with cold ether giving 3.43 g. of product, m.p. 70°–72° C. An additional 5.77 g. of the product, m.p. 68°–70° C. was obtained from the filtrate. The combined crops were recrystallized from benzene-hexane to give 8.0 g. of 2-diazo-3',5'-dimethoxyacetophenone as yellow crystals, m.p. 70°–72° C.

A mixture of 17 g. (0.08 mole) of 2-diazo-3',5'-dimethoxyacetophenone, 57 ml. of dioxane, and 34 ml. of water was saturated at −5° to −10° C. with dimethylamine until a total of 100 g. of dimethylamine had been taken up by the solution. A solution of 3.4 g. (0.02 mole) of silver nitrate in 5 ml. of water was then added, and the mixture sealed in a rocking autoclave, was pressurized to 200 pounds p.s.i. with nitrogen and heated at 55° C. for about an hour and a half and then at 70° C. for about 10 hours. The autoclave was then cooled, the pressure released, and the contents diluted with 200 ml. of water and extracted continuously with ether for about 8 hours. After drying the ether extracts were evaporated, and the residue, which solidified on seeding and scratching, was recrystallized from petroleum ether giving 11 g. of (3,5-dimethoxyphenyl)-N,N-dimethylacetamide, m.p. 60°–62° C.

Anal. Calcd. for $C_{12}H_{17}NO_3$: C, 64.54; H, 7.68; N, 6.27
Found: C, 64.35; H, 7.60; N, 6.32.

A solution of 19 g. (0.085 mole) of (3,5-dimethoxyphenyl)-N,N-dimethylacetamide in 300 ml. of dry ether was added dropwise over a period of 2 hours to a refluxing mixture of 3.8 g. (0.10 mole) of lithium aluminum hydride in ether. The mixture was refluxed for an additional eighteen hours, cooled, the excess lithium aluminum hydride decomposed with moist ether, and the mixture made alkaline with 100 ml. of 20 percent aqueous potassium hydroxide. The alkaline solution was extracted with ether, and the combined extracts dried over sodium sulfate, filtered, concentrated to a volume of about 200 ml., and saturated with anhydrous hydrogen chloride. The granular solid which separated was collected, washed with ether, and dried to give 19.6 g. of N,N-dimethyl-2-(3,5-dimethoxyphenyl)ethylamine hydrochloride, m.p. 162°–165° C. A small amount recrystallized from acetone gave colorless crystals having m.p. 162°–164° C.

Anal. Calcd. for $C_{12}H_{19}NO_2 \cdot HCl$: C, 58.64; H, 8.20; N, 5.69
Found: C, 58.79; H, 7.95; N, 5.85.

A solution of 10 g. (0.04 mole) of N,N-dimethyl-2-(3,5-dimethoxyphenyl)ethylamine hydrochloride in 130 ml. of 57 percent hydriodic acid was prepared in a flask well-flushed with nitrogen and equipped with a nitrogen inlet, dropping funnel, mechanical stirrer, thermometer, and reflux condenser. To the mixture was added 90 ml. (0.95 mole) of acetic anhydride in a slow stream, and the mixture was then heated with an external oil bath at 160° C. for 1 hour. The solution was then taken to dryness, the residue stirred with 50 ml. of water and taken to dryness once again. Further drying and seeding caused the oily residue to solidify, and the solid was triturated with ethyl acetate and collected to give 11.4 g. of 5-(2-dimethylaminoethyl)resorcinol hydriodide, m.p. 88°–89° C. One recrystallization from isopropanol-ether-ethyl acetate gave material of m.p. 101°–102° C.

Anal. Calcd. for $C_{10}H_{15}NO_2 \cdot HI$: Neut. Equiv. 309.1
Found: Neut. Equiv. 308.2.

A mixture of 15 g. (0.048 mole) of 5-(2-dimethylaminoethyl)resorcinol hydriodide and 15 g. (0.81 mole) of 5-methyl-2-carbethoxycyclohexanone was treated dropwise with 20 ml. of concentrated sulfuric acid, followed by 10 ml. of phosphorus oxychloride added all at once. The resulting mixture was stirred at room temperature for 20 hours and then poured into water. The dark, gummy residue was stirred with an excess of aqueous sodium thiosulfate on a steam bath until all the iodine had reacted and the color had lightened. The gum was then washed first with water, then with aqueous sodium bicarbonate, and taken into chloroform. The chloroform solution was washed again with bicarbonate solution, then with water, dried, concentrated to a small volume, filtered, and the filtrate evaporated to dryness. The residue was extracted four times with boiling acetonitrile from which was obtained a total of 2.1 g. of 3-(2-dimethylaminoethyl)-1-hydroxy-9-methyl-6-oxo-7,8,9,10-tetrahydro-6H-dibenzo[b,d]pyran, m.p. 164°–169° C.

A small amount of the product was converted to the picrate salt which was recrystallized from ethanol giving material of m.p. 252°–255° C.

Anal. Calcd. for $C_{24}H_{28}N_4O_{11}$: C, 52.55; H, 5.14; N, 10.21
Found: C, 52.34; H, 5.45; N, 10.55.

B. 3-(2-Dimethylaminoethyl)-1-hydroxy-6,6,9-trimethyl-7,8,9,10-tetrahydro-6H-dibenzo[b,d]pyran.

A solution of 2.5 g. (0.0083 mole) of 3-(2-dimethylaminoethyl)-1-hydroxy-9-methyl-6-oxo-7,8,9,10-tetrahydro-6H-dibenzo[b,d]pyran in 50 ml. of dry pyridine was added dropwise to a solution containing 0.1 mole of methyl magnesium iodide in 50 ml. of dry anisole, and the mixture was stirred for 16 hours under nitrogen at 60°–65° C. The mixture was then cooled, the excess Grignard reagent decomposed by the addition of 150 ml. of water, and acidified with 200 ml. of 4N sulfuric acid. Removal of the anisole by steam distillation and filtration of the resulting solution afforded 1.7 g. of a brown solid which consisted of a mixture of the free base form and the bisulfate salt form of the desired product. About 500 mg. of this mixture was dissolved in chloroform, neutralized with aqueous sodium bicarbonate, and the chloroform solution was washed with water, dried, and evaporated to dryness. The residue thus obtained was recrystallized from acetonitrile giving 200 mg. of 3-(2-dimethylaminoethyl)-1-hydroxy-6,6,9-trimethyl-7,8,9,10-tetrahydro-6H-dibenzo[b,d]pyran as a colorless solid, m.p. 150°–152.5° C.

Anal. Calcd. for $C_{20}H_{29}NO_2$: C, 76.15; H, 9.27; N, 4.44
Found: C, 76.13; H, 9.15; N, 4.27.

EXAMPLE 2

3-(2-Dimethylaminoethyl)-1-hydroxy-6,6-dihexyl-9-methyl-7,8,9,10-tetrahydro-6H-dibenzo[b,d]pyran is prepared by reacting 3-(2-dimethylaminoethyl)-1-hydroxy-9-methyl-6-oxo-7,8,9,10-tetrahydro-6H-dibenzo[b,d]pyran with n-hexyl magnesium iodide in anisole according to the manipulative procedure described above in Example 1B.

EXAMPLE 3

1-(2-Dimethylaminoethyl)-3-hydroxy-6,6,9-trimethyl-7,8,9,10-tetrahydro-6H-dibenzo[b,d]pyran.

A. 1-(2-Dimethylaminoethyl)-3-hydroxy-9-methyl-6-oxo-7,8,9,10-tetrahydro-6H-dibenzo[b,d]pyran is prepared by reacting 5-methyl-2-carbethoxycyclohexanone with 5-(N,N-dimethylaminoethyl)resorcinol in the presence of concentrated sulfuric acid and phosphorus oxychloride according to the manipulative procedure described above in Example 1A.

B. 1-(2-Dimethylaminoethyl)-3-hydroxy-6,6,9-trimethyl-7,8,9,10-tetrahydro-6H-dibenzo[b,d]pyran is prepared by reacting 1-(2-dimethylaminoethyl)-3-hydroxy-9-methyl-6-oxo-7,8,9,10-tetrahydro-6H-dibenzo[b,d]pyran with methyl magnesium iodide in anisole according to the manipulative procedure described above in Example 1B.

EXAMPLE 4

1-(2-Dimethylaminoethyl)-3-hydroxy-6,6-dihexyl-9-methyl-7,8,9,10-tetrahydro-6H-dibenzo[b,d]pyran is prepared by reacting 1-(2-dimethylaminoethyl)-3-hydroxy-9-methyl-6-oxo-7,8,9,10-tetrahydro-6H-dibenzo[b,d]pyran with n-hexyl magnesium bromide in anisole according to the manipulative procedure described above in Example 1B.

EXAMPLE 5

3-[(1-Morpholino)methyl]-1-hydroxy-6,6-dimethyl-7,8,9,10-tetrahydro-6H-dibenzo[b,d]pyran.

A. 3-[(1-Morpholino)methyl]-1-hydroxy-6-oxo-7,8,9,10-tetrahydro-6H-dibenzo[b,d]pyran.

By reaction of 3,5-dimethoxybenzoyl chloride with morpholine, reduction of the resulting 1-(3,5-dimethoxybenzoyl)-morpholine with lithium aluminum hydride, and cleavage of the resulting 5-[(1-morpholino)methyl]resorcinol dimethyl ether with hydriodic acid in acetic anhydride all according to the procedure described in Example 1A above, there is obtained 5-[(1-morpholino)methyl]resorcinol.

By reacting 2-carbethoxycyclohexanone with 5-[(1-morpholino)methyl]resorcinol in the presence of concentrated sulfuric acid and phosphorus oxychloride according to the manipulative procedure described above in Example 1A, there is obtained 3-[(1-morpholino)methyl]-1-hydroxy-6-oxo-7,8,9,10-tetrahydro-6H-dibenzo[b,d]pyran.

B. 3-[(1-Morpholino)methyl]-1-hydroxy-6,6-dimethyl-7,8,9,10-tetrahydro-6H-dibenzo[b,d]pyran is prepared by reacting 3-[(1-morpholino)methyl]-1-hydroxy-6-oxo-7,8,9,10-tetrahydro-6H-dibenzo[b,d]pyran with methyl magnesium iodide in anisole according to the manipulative procedure described above in Example 1B.

EXAMPLE 6

1-[(1-Morpholino)methyl]-3-hydroxy-6,6-dimethyl-7,8,9,10-tetrahydro-6H-dibenzo[b,d]pyran A. 1-[(1-Morpholino)methyl]-3-hydroxy-6-oxo-7,8,9,10-tetrahydro-6H-dibenzo[b,d]pyran is prepared by reacting 2-carbethoxycyclohexanone with 5-[(1-morpholino)methyl]resorcinol in the presence of concentrated sulfuric acid and phosphorus oxychloride according to the manipulative procedure described above in Example 1A.

B. 1-[(1-Morpholino)methyl]-3-hydroxy-6,6-dimethyl-7,8,9,10-tetrahydro-6H-dibenzo[b,d]pyran is prepared by reacting 1-[(1-morpholino)methyl]-3-hydroxy-6-oxo-7,8,9,10-tetrahydro-6H-dibenzo[b,d]pyran with methyl magnesium iodide in ansiole according to the manipulative procedure described above in Example 1B.

EXAMPLE 7

3-[6-(1-Pyrrolidino)hexyl]-1-hydroxy-6,6,9-trimethyl-7,8,9,10-tetrahydro-6H-dibenzo[b,d]pyran A. 3-[6-(1-Pyrrolidino)hexyl]-1-hydroxy-9-methyl-6-oxo-7,8,9,10-tetrahydro-6H-dibenzo[b,d]pyran.

By reducing (3,5-dimethoxyphenyl)acetic acid with lithium aluminum hydride using the procedure described above in Example 1A; reacting the resulting 2-(3,5-dimethoxyphenyl)ethanol with thionyl chloride in the presence of pyridine; reacting the resulting 2-(3,5-dimethoxyphenyl)ethyl chloride with diethyl malonate in the presence of sodium ethoxide; saponifying and decarboxylating the resulting diethyl α-[2-(3,5-dimethoxyphenyl)ethyl]malonate with aqueous sulfuric acid; reducing with lithium aluminum hydride the resulting γ-(3,5-dimethoxyphenyl)butyric acid using the procedure described above in Example 1A; reacting the resulting 4-(3,5-dimethoxyphenyl)butanol with thionyl chloride in pyridine; reacting the resulting 4-(3,5-dimethoxyphenyl)butyl chloride with diethyl malonate in the presence of sodium ethoxide; saponifying the resulting diethyl α-[4-(3,5-dimethoxyphenyl)butyl]malonate with aqueous sulfuric acid; reacting the resulting ε-(3,5-dimethoxyphenyl)caproic acid with thionyl chloride; reacting the resulting acid chloride with pyrrolidine using the procedure described in Example 1A above; reducing with lithium aluminum the resulting 1-[ε-(3,5-dimethoxyphenyl)caproyl]-pyrrolidine; and cleavage of the resulting 6-(3,5-dimethoxyphenyl)hexylamine with hydriodic acid in acetic anhydride, there is obtained 5-[6-(1-pyrrolidino)hexyl]resorcinol.

By reacting 5-methyl-2-carbethoxycyclohexanone with 5-[6-(1-pyrrolidino)hexyl]resorcinol in the presence of concentrated sulfuric acid and phosphorus oxychloride according to the manipulative procedure described above in Example 1A, there is obtained 3-[6-(1-pyrrolidino)hexyl]-1-hydroxy-9-methyl-6-oxo-7,8,9,10-tetrahydro-6H-dibenzo[b,d]pyran.

B. 3-[6-(1-Pyrrolidino)hexyl]-1-hydroxy-6,6,9-trimethyl-7,8,9,10-tetrahydro-6H-dibenzo[b,d]pyran is prepared by reacting 3-[6-(1-pyrrolidino)hexyl]-1-hydroxy-9-methyl-6-oxo-7,8,9,10-tetrahydro-6H-dibenzo[b,d]pyran with methyl magnesium iodide in anisole according to the manipulative procedure described above in Example 1B.

EXAMPLE 8

1-[6-(1-Pyrrolidino)hexyl]-3-hydroxy-6,6,9-trimethyl-7,8,9,10-tetrahydro-6H-dibenzo[b,d]pyran A. 1-[6-(1-Pyrrolidino)hexyl]-3-hydroxy-9-methyl-6-oxo-7,8,9,10-tetrahydro-6H-dibenzo[b,d]pyran is prepared by reacting 5-methyl-2-carbethoxycyclohexanone with 5-[6-(1-pyrrolidino)hexyl]resorcinol in the presence of concentrated sulfuric acid and phosphorus oxychloride according to the manipulative procedure described above in Example 1A.

B. 1-[6-(1-Pyrrolidino)hexyl]-3-hydroxy-6,6,9-trimethyl-7,8,9,10-tetrahydro-6H-dibenzo[b,d]pyran is prepared by reacting 1-[6-(1-pyrrolidino)hexyl]-3-hydroxy-9-methyl-6-oxo-7,8,9,10-tetrahydro-6H-dibenzo[b,d]pyran with methyl magnesium iodide in anisole according to the manipulative procedure described above in Example 1B.

EXAMPLE 9

3-[3-(1-Piperidino)propyl]-1-hydroxy-6,6,9-trimethyl-7,8,9,10-tetrahydro-6H-dibenzo[b,d]pyran A. 3-[3-(1-Piperidino)propyl]-1-hydroxy-9-methyl-6-oxo-7,8,9,10-tetrahydro-6H-dibenzo[b,d]pyran.

By reacting the 2-(3,5-dimethoxyphenyl)ethyl chloride described above in Example 7A with sodium cyanide in ethanol in the presence of sodium iodide, and hydrolysis of the resulting β-(3,5-dimethoxyphenyl)propionitrile with aqueous sodium hydroxide, there is obtained β-(3,5-dimethoxyphenyl)propionic acid. Conversion of the latter to the corresponding acid chloride by reaction with thionyl chloride using the procedure described above in Example 1A, reaction of the acid chloride with piperidine, reduction of the resulting 1-[β-(3,5-dimethoxyphenyl)-propionyl]piperidine with lithium aluminum hydride and cleavage with hydriodic acid in acetic anhydride of the resulting 1-[3-(3,5-dimethoxyphenyl)propyl]piperidine using the procedure described above in Example 1A affords 5-[3-(1-piperidino)propyl]resorcinol.

By reacting 5-methyl-2-carbethoxycyclohexanone with 5-[3-(1-piperidino)propyl]resorcinol in the presence of concentrated sulfuric acid and phosphorus oxychloride according to the manipulative procedure described above in Example 1A, there is obtained 3-[3-(1-piperidino)propyl]-1-hydroxy-9-methyl-6-oxo-7,8,9,10-tetrahydro-6H-dibenzo[b,d]pyran.

B. 3-[3-(1-Piperidino)propyl]-1-hydroxy-6,6,9-trimethyl-7,8,9,10-tetrahydro-6H-dibenzo[b,d]pyran is prepared by reacting 3-[3-(1-piperidino)propyl]-1-hydroxy-9-methyl-6-oxo-7,8,9,10-tetrahydro-6H-dibenzo[b,d]pyran with methyl magnesium iodide in anisole according to the manipulative procedure described above in Example 1B.

EXAMPLE 10

1-[3-(1-Piperidino)propyl]-3-hydroxy-6,6,9-trimethyl-7,8,9,10-tetrahydro-6H-dibenzo[b,d]pyran A. 1-[3-(1-Piperidino)propyl]-3-hydroxy-9-methyl-6-oxo-7,8,9,10-tetrahydro-6H-dibenzo[b,d]pyran is prepared by reacting 5-methyl-2-carbethoxycyclohexanone with 5-[3-(1-piperidino)propyl]resorcinol in the presence of concentrated sulfuric acid and phosphorus oxychloride according to the manipulative procedure described above in Example 1A.

B. 1-[3-(1-Piperidino)propyl]-3-hydroxy-6,6,9-trimethyl-7,8,9,10-tetrahydro-6H-dibenzo[b,d]pyran is prepared by reacting 1-[3-(1-piperidino)propyl]-3-hydroxy-9-methyl-6-oxo-7,8,9,10-tetrahydro-6H-dibenzo[b,d]pyran with methyl magnesium iodide in anisole according to the manipulative procedure described above in Example 1B.

EXAMPLE 11

3-(Dibutylaminoethyl)-1-hydroxy-6,6-dimethyl-10-ethyl-7,8,9,10-tetrahydro-6H-dibenzo[b,d]pyran.

A. 3-(Dibutylaminoethyl)1-hydroxy-10-ethyl-6-oxo-7,8,9,10-tetrahydro-6H-dibenzo[b,d]pyran.

By reacting the 2-diazo-3',5'-dimethoxyacetophenone described above in Example 1A with dibutylamine in the presence of silver nitrate, reducing the resulting (3,5-dimethoxyphenyl)-N,N-dibutylacetamide with lithium aluminum hydride, and cleavage of the resulting N,N-dibutyl-2-(3,5-dimethoxyphenyl)ethylamine with hydriodic acid in acetic anhydride all according to the procedure described above in Example 1A, there can be obtained 5-[2-(dibutylamino)ethyl]resorcinol.

By reacting 2-carbethoxy-6-ethylcyclohexanone with 5-[2-(dibutylamino)ethyl]resorcinol in the presence of concentrated sulfuric acid and phosphorus oxychloride according to the manipulative procedure described above in Example 1A, there can be obtained 3-(dibutylaminoethyl)-1-hydroxy-10-ethyl-6-oxo-7,8,9,10-tetrahydro-6H-dibenzo[b,d]pyran.

B. 3-(Dibutylaminoethyl)-1-hydroxy-6,6-dimethyl-10-ethyl-7,8,9,10-tetrahydro-6H-dibenzo[b,d]pyran is prepared by reacting 3-(dibutylaminoethyl)-1-hydroxy-10-ethyl-6-oxo-7,8,9,10-tetrahydro-6H-dibenzo[b,d]pyran with methyl magnesium iodide in anisole according to the manipulative procedure described above in Example 1B.

EXAMPLE 12

1-(Dibutylaminoethyl)-3-hydroxy-6,6-dimethyl-10-ethyl-7,8,9,10-tetrahydro-6H-dibenzo[b,d]pyran
A. 1-(Dibutylaminoethyl)-3-hydroxy-10-ethyl-6-oxo-7,8,9,10-tetrahydro-6H-dibenzo[b,d]pyran is prepared by reacting 2-carbethoxy-6-ethylcyclohexanone with 5-[2-(dibutylamino)ethyl]resorcinal in the presence of concentrated sulfuric acid and phosphorus oxychloride according to the manipulative procedure described above in Example 1A.
B. 1-(Dibutylaminoethyl)-3-hydroxy-6,6-dimethyl-10-ethyl-7,8,9,10-tetrahydro-6H-dibenzo[b,d]pyran is prepared by reacting 1-(dibutylaminoethyl)-3-hydroxy-10-ethyl-6-oxo-7,8,9,10-tetrahydro-6H-dibenzo[b,d]pyran with methyl magnesium iodide in anisole according to the manipulative procedure described above in Example 1B.

EXAMPLE 13

1-Acetoxy-3-(2-dimethylaminoethyl)-6,6,9-trimethyl-7,8,9,10-tetrahydro-6H-dibenzo[b,d]pyran.
By reacting 3-(2-dimethylaminoethyl)-1-hydroxy-6,6,9-trimethyl-7,8,9,10-tetrahydro-6H-dibenzo[b,d]pyran with acetic anhydride, there is obtained 1-acetoxy-3-(2-dimethylaminoethyl)-6,6,9-trimethyl-7,8,9,10-tetrahydro-6H-dibenzo[b,d]pyran.

EXAMPLE 14

3-Acetoxy-1-(2-dimethylaminoethyl)-6,6,9-trimethyl-7,8,9,10-tetrahydro-6H-dibenzo[b,d]pyran.
By reacting 1-(2-dimethylaminoethyl)-3-hydroxy-6,6,9-trimethyl-7,8,9,10-tetrahydro-6H-dibenzo[b,d]pyran with acetic anhydride, there is obtained 3-acetoxy-1-(2-dimethylaminoethyl)-6,6,9-trimethyl-7,8,9,10-tetrahydro-6H-dibenzo[b,d]pyran.

EXAMPLE 15

3-(2-Dimethylaminoethyl)-1-methoxy-6,6,9-trimethyl-7,8,9,10-tetrahydro-6H-dibenzo[b,d]pyran.
By reacting 3-(2-dimethylaminoethyl)-1-hydroxy-6,6,9-trimethyl-7,8,9,10-tetrahydro-6H-dibenzo[b,d]pyran with methyl iodide in the presence of sodium ethoxide, there is obtained 3-(2-dimethylaminoethyl)-1-methoxy-6,6,9-trimethyl-7,8,9,10-tetrahydro-6H-dibenzo[b,d]pyran.

EXAMPLE 16

1-(2-Dimethylaminoethyl)-3-methoxy-6,6,9-trimethyl-7,8,9,10-tetrahydro-6H-dibenzo[b,d]pyran.
By reacting 1-(2-dimethylaminoethyl)-3-hydroxy-6,6,9-trimethyl-7,8,9,10-tetrahydro-6H-dibenzo[b,d]pyran with methyl iodide in the presence of sodium ethoxide, there is obtained 1-(2-dimethylaminoethyl)-3-methoxy-6,6,9-trimethyl-7,8,9,10-tetrahydro-6H-dibenzo[b,d]pyran.

EXAMPLE 17

3-(2-Dimethylaminoethyl)-1-carbamyloxy-6,6,9-trimethyl-7,8,9,10-tetrahydro-6H-dibenzo[b,d]pyran.
By reacting 3-(2-dimethylaminoethyl)-1-hydroxy-6,6,9-trimethyl-7,8,9,10-tetrahydro-6H-dibenzo[b,d]pyran with an equimolar amount of phosgene in the presence of dimethylaniline, and reacting the resulting chloroformate with liquid ammonia, there is obtained 3-(2-dimethylaminoethyl)-1-carbamyloxy-6,6,9-trimethyl-7,8,9,10-tetrahydro-6H-dibenzo[b,d]pyran.

EXAMPLE 18

1-(2-Dimethylaminoethyl)-3-carbamyloxy-6,6,9-trimethyl-7,8,9,10-tetrahydro-6H-dibenzo[b,d]pyran.
By reacting 1-(2-dimethylaminoethyl)-3-hydroxy-6,6,9-trimethyl-7,8,9,10-tetrahydro-6H-dibenzo[b,d]pyran with an equimolar amount of phosgene in the presence of dimethylaniline, and reacting the resulting chloroformate with liquid ammonia, there is obtained 1-(2-dimethylaminoethyl)-3-carbamyloxy-6,6,9-trimethyl-7,8,9,10-tetrahydro-6H-dibenzo[b,d]pyran.

EXAMPLE 19

3-(2-Dimethylaminoethyl)-1-(N-methylcarbamyloxy)-6,6,9-trimethyl-7,8,9,10-tetrahydro-6H-dibenzo[b,d]pyran.
By reacting 3-(2-dimethylaminoethyl)-1-hydroxy-6,6,9-trimethyl-7,8,9,10-tetrahydro-6H-dibenzo[b,d]pyran with an equimolar amount of phosgene in the presence of dimethylaniline, and reacting the resulting chloroformate with methylamine, there is obtained 3-(2-dimethylaminoethyl)-1-(N-methylcarbamyloxy)-6,6,9-trimethyl-7,8,9,10-tetrahydro-6H-dibenzo[b,d]pyran.

EXAMPLE 20

1-(2-Dimethylaminoethyl)-3-(N-methylcarbamyloxy)-6,6,9-trimethyl-7,8,9,10-tetrahydro-6H-dibenzo[b,d]pyran.
By reacting 1-(2-dimethylaminoethyl)-3-hydroxy-6,6,9-trimethyl-7,8,9,10-tetrahydro-6H-dibenzo[b,d]pyran with an equimolar amount of phosgene in the presence of dimethylaniline, and reacting the resulting chloroformate with methylamine, there is obtained 1-(2-dimethylaminoethyl)-3-(N-methylcarbamyloxy)-6,6,9-trimethyl-7,8,9,10-tetrahydro-6H-dibenzo[b,d]pyran.

EXAMPLE 21

3-(2-Dimethylaminoethyl)-1-(N,N-dimethylcarbamyloxy)-6,6,9-trimethyl-7,8,9,10-tetrahydro-6H-dibenzo[b,d]pyran.
By reacting 3-(2-dimethylaminoethyl)-1-hydroxy-6,6,9-trimethyl-7,8,9,10-tetrahydro-6H-dibenzo[b,d]pyran with an equimolar amount of phosgene in the presence of dimethylaniline, and reacting the resulting chloroformate with dimethylamine, there is obtained 3-(2-dimethylaminoethyl)-1-(N,N-dimethylcarbamyloxy)-6,6,9-trimethyl-7,8,9,10-tetrahydro-6H-dibenzo[b,d]pyran.

EXAMPLE 22

1-(2-Dimethylaminoethyl)-3-(N,N-dimethylcarbamyloxy)-6,6,9-trimethyl-7,8,9,10-tetrahydro-6H-dibenzo[b,d]pyran.
By reacting 1-(2-dimethylaminoethyl)-3-hydroxy-6,6,9-trimethyl-7,8,9,10-tetrahydro-6H-dibenzo[b,d]pyran with an equimolar amount of phosgene in the presence of dimethylaniline, and reacting the resulting chloroformate with dimethylamine, there is obtained 1-(2-dimethylaminoethyl)-3-(N,N-dimethylcarbamyloxy)-6,6,9-trimethyl-7,8,9,10-tetrahydro-6H-dibenzo[b,d]pyran.

EXAMPLE 23

3-(2-Dimethylaminoethyl)-1-phosphonyloxy-6,6,9-trimethyl-7,8,9,10-tetrahydro-6H-dibenzo[b,d]pyran.
By reacting 3-(2-dimethylaminoethyl)-1-hydroxy-6,6,9-trimethyl-7,8,9,10-tetrahydro-6H-dibenzo[b,d]pyran with one molar equivalent amount of phosphorus oxychloride in toluene in the presence of pyridine, and reacting the resulting dichlorophosphinate with aqueous potassium carbonate, there is obtained 3-(2-dimethylaminoethyl)-1-phosphonyloxy-6,6,9-trimethyl-7,8,9,10-tetrahydro-6H-dibenzo[b,d]pyran.

EXAMPLE 24

1-(2-Dimethylaminoethyl)-3-phosphonyloxy-6,6,9-trimethyl-7,8,9,10-tetrahydro-6H-dibenzo[b,d]pyran.

By reacting 1-(2-dimethylaminoethyl)-3-hydroxy-6,6,9-trimethyl-7,8,9,10-tetrahydro-6H-dibenzo[b,d]pyran with one molar equivalent amount of phosphorus oxychloride in toluene in the presence of pyridine, and reacting the resulting dichlorophosphinate with aqueous potassium carbonate, there is obtained 1-(2-dimethylaminoethyl)-3-phosphonyloxy-6,6,9-trimethyl-7,8,9,10-tetrahydro-6H-dibenzo[b,d]pyran.

EXAMPLE 25

3-(2-Dimethylaminoethyl)-1-hydroxy-6,6,9-trimethyl-7,8,9,1011,12-hexahydro-6H-dibenzo[b,d]pyran.

By reduction of 3-(2-dimethylaminoethyl)-1-hydroxy-6,6,9-trimethyl-7,8,9,10-tetrahydro-6H-dibenzo[b,d]pyran with hydrogen over a Raney nickel catalyst in an organic solvent, for example ethanol, there can be obtained 3-(2-dimethylaminoethyl)-1-hydroxy-6,6,9-trimethyl-7,8,9,10,11,12-hexahydro-6H-dibenzo[b,d]pyran.

EXAMPLE 26

By reducing the compounds of Examples 2, 3B, 4, 5B, 6B, 7B, 8B, 9B, 10B, 11B, 12B, 13, 14, 15, 16, 17, 18, 19, 20, 21, 22, 23, and 24 with hydrogen over a Raney nickel catalyst, following the procedure described above in Example 25, there can be obtained the following respective compounds of formulas IIa and IIb:

A. 3-(2-Dimethylaminoethyl)-1-hydroxy-6,6-dihexyl-9-methyl-7,8,9,10,11,12-hexahydro-6H-dibenzo[b,d]pyran.
B. 1-(2-Dimethylaminoethyl)-3-hydroxy-6,6,9-trimethyl-7,8,9,10,11,12-hexahydro-6H-dibenzo[b,d]pyran.
C. 1-(2-Dimethylaminoethyl)-3-hydroxy-6,6-dihexyl-9-methyl-7,8,9,10,11,12-hexahydro-6H-dibenzo[b,d]pyran.
D. 3-[(1-Morpholino)methyl]-1-hydroxy-6,6-dimethyl-7,8,9,10,-11,12-hexahydro-6H-dibenzo[b,d]pyran.
E. 1-[(1-Morpholino)methyl]-3-hydroxy-6,6-dimethyl-7,8,9,10,-11,12-hexahydro-6H-dibenzo[b,d]pyran.
F. 3-[6-(1-Pyrrolidino)hexyl]-1-hydroxy-6,6,9-trimethyl-7,8,9,10,11,12-hexahydro-6H-dibenzo[b,d]pyran.
G. 1-[6-(1-Pyrrolidino)hexyl]-3-hydroxy-6,6,9-trimethyl-7,8,9,10,11,12-hexahydro-6H-dibenzo[b,d]pyran.
H. 3-[3-(1-Piperidino)propyl]-1-hydroxy-6,6,9-trimethyl-7,8,9,10,11,12-hexahydro-6H-dibenzo[b,d]pyran.
J. 1-[3-(1-Piperidino)propyl]-3-hydroxy-6,6,9-trimethyl-7,8,9,10,11,12-hexahydro-6H-dibenzo[b,d]pyran.
K. 3-(Dibutylaminoethyl)-1-hydroxy-6,6-dimethyl-10-ethyl-7,8,9,10,11,12-hexahydro-6H-dibenzo[b,d]pyran.
L. 1-(Dibutylaminoethyl)-3-hydroxy-6,6-dimethyl-10-ethyl-7,8,9-10,11,12-hexahydro-6H-dibenzo[b,d]pyran.
M. 1-Acetoxy-3-(2-dimethylaminoethyl)-6,6,9-trimethyl-7,8,9,10,-11,12-hexahydro-6H-dibenzo[b,d]pyran.
N. 3Acetoxy-1-(2-dimethylaminoethyl)-6,6,9-trimethyl-7,8,9,10-11,12-hexahydro-6H-dibenzo[b,d]pyran.
O. 3-(2-Dimethylaminoethyl)-1-methoxy-6,6,9-trimethyl-7,8,9,10,-11,12-hexahydro-6H-dibenzo[b,d]pyran.
P. 1-(2-Dimethylaminoethyl)-3-methoxy-6,6,9-trimethyl-7,8,9,10-11,12-hexahydro-6H-dibenzo[b,d]pyran.
Q. 3-(2-Dimethylaminoethyl)-1-carbamyloxy-6,6,9-trimethyl-7,8,9,10,11,12-hexahydro-6H-dibenzo[b,d]pyran.
R. 1-(2-Dimethylaminoethyl)-3-carbamyloxy-6,6,9-trimethyl-7,8,9,10,11,12-hexahydro-6H-dibenzo[b,d]pyran.
S. 3-(2-Dimethylaminoethyl)-1-(N-methylcarbamyloxy)-6,6,9-trimethyl-7,8,9,10,11,12-hexahydro-6H-dibenzo[b,d]pyran.
T. 1-(2-Dimethylaminoethyl)-3-(N-methylcarbamyloxy)-6,6,9-trimethyl-7,8,9,10,11,12-hexahydro-6H-dibenzo[b,d]pyran.
U. 3-(2-Dimethylaminoethyl)-1-(N,N-dimethylcarbamyloxy)-6,6,9-trimethyl-7,8,9,10,11,12-hexahydro-6H-dibenzo[b,d]pyran.
V. 1-(2-Dimethylaminoethyl)-3-(N,N-dimethylcarbamyloxy)-6,6,9-trimethyl-7,8,9,10,11,12-hexahydro-6H-dibenzo[b,d]pyran.
W. 3-(2-Dimethylaminoethyl)-1-phosphonyloxy-6,6,9-trimethyl-7,8,9,10,11,12-hexahydro-6H-dibenzo[b,d]pyran.
X. 1-(2-Dimethylaminoethyl)-3-phosphonyloxy-6,6,9-trimethyl-7,8,9,10,11,12-hexahydro-6H-dibenzo[b,d]pyran.

We claim:
1. A compound having the formula

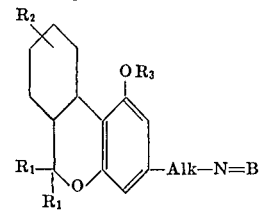

where $R_1$ is lower-alkyl; $R_2$ is hydrogen or lower-alkyl; $R_3$ is hydrogen, lower-alkyl, lower-alkanoyl, carbamyl, N-lower-alkyl-carbamyl, N,N-di-lower-alkylcarbamyl, or phosphonyl; Alk is lower-alkylene; and N = B is di-lower-alkylamino.

2. A compound according to claim 1 where $R_2$ is lower-alkyl and $R_3$ is hydrogen.

3. 3-(2-Dimethylaminoethyl)-1-hydroxy-6,6,9-trimethyl-7,8,9,10-tetrahydro-6H-dibenzo[b,d]pyran according to claim 2 where $R_2$ as lower-alkyl is 9-methyl; Alk as lower-alkylene is 1,2-ethylene; and N B as di-lower-alkylamino is dimethylamino.

* * * * *